J. Knickerbocker,
Harrow.
No. 92320.          Patented July 6, 1869.
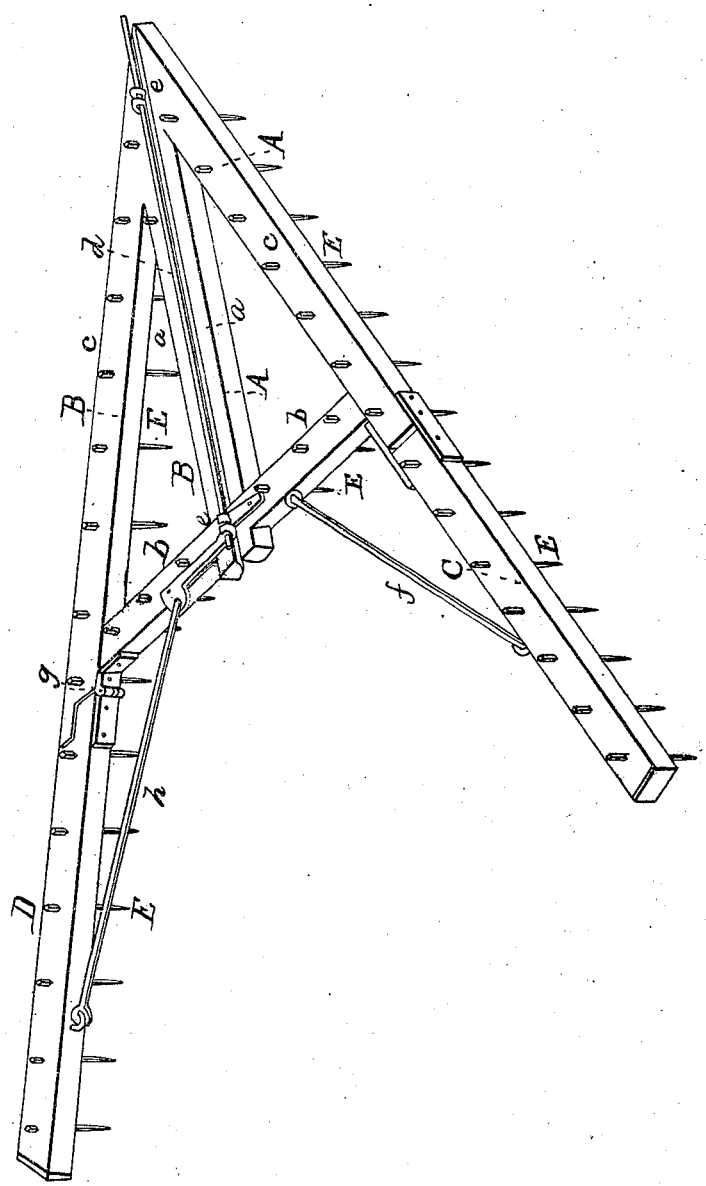
Witnesses.
Alex F. Roberts.
Wm A Swagan.
Inventor.
J. Knickerbocker
Per Munn &Co

United States Patent Office.

JAY KNICKERBOCKER, OF DUNNING, PENNSYLVANIA.

Letters Patent No. 92,320, dated July 6, 1869.

IMPROVEMENT IN HARROWS.

The Schedule referred to in these Letters Patent and making part of the same.

*To all whom it may concern:*

Be it known that I, JAY KNICKERBOCKER, of Dunning, in the county of Luzerne, and State of Pennsylvania, have invented a new and improved Harrow; and I do hereby declare that the following is a full, clear, and exact description thereof, which will enable others skilled in the art to make and use the same, reference being had to the accompanying drawing, forming part of this specification.

The drawing represents a perspective view of my improved harrow.

This invention relates to a new jointed harrow, which is so arranged, by being made of several pieces, which are hinged together, that it will adjust itself to the nature of the ground, and that it may, to avoid trees, stumps or rocks, be folded together, and made narrower, without difficulty. After the obstruction has been passed, it can at once be readjusted to its former size and form. It may be taken apart, and portions of it used separately, for cultivating corn, potato, or cotton-fields.

The harrow is composed of four pieces, A B C D.

The front pieces, A B, are two right-angled triangles, which are, with their longest catheti, a a, placed together, so that their shortest sides, b b, will be in line. Their converging longest sides, c, form the point of the harrow.

The two triangles A B are pivoted together by a rod, d, passing through eyes e e, formed on both triangles, as shown.

C D are bars, attached to the rear of the triangles A B, respectively, to form continuations of the lines c c.

These bars may be rigidly attached, and braced, as at f; or they may be hinged, as at g, and braced by a hinged bar, h.

I prefer to have one bar, C, rigid, and one hinged.

When a stump is to be avoided, the brace of the hinged bar may be unhooked, and then the hinged bar will swing to the inside, and adjust itself to avoid the obstruction.

When to be passed through between two obstructions, one triangle may be folded upon the other, whereby the width of the harrow is halved.

The connections between the bars C D and the triangles are so arranged that a slight up-and-down play is allowed to the bars, to enable them and the triangles to pass over stones without lifting the whole harrow.

The teeth E E are arranged on the bars of the triangles, and on the bars C D, as shown in the drawing.

One of the triangles may be used separately, to be drawn over corn, potato, or cotton-fields.

Having thus described my invention,

What I claim as new, and desire to secure by Letters Patent, is—

An adjustable harrow, consisting of the triangles A B and bars C D, the triangles being pivoted together, and one or both of the bars being hinged to the triangles, substantially as herein shown and described.

JAY KNICKERBOCKER.

Witnesses:
   C. K. SHOEMAKER,
   PHILO REISINGER.